United States Patent [19]
Chang et al.

[11] Patent Number: 5,192,437
[45] Date of Patent: Mar. 9, 1993

[54] SPIRAL FILTRATION MODULE WITH IMPROVED CLEANABILITY AND OPERATING EFFICIENCY

[75] Inventors: Jikuo Chang, Tyngsboro; Robert G. Blanck, Stoneham, both of Mass.

[73] Assignee: Koch Membrane Systems, Inc., Wilmington, Mass.

[21] Appl. No.: 570,138

[22] Filed: Aug. 20, 1990

[51] Int. Cl.$^5$ .............................................. B01D 61/18
[52] U.S. Cl. .......................... 210/321.83; 210/321.89; 55/158
[58] Field of Search ..................... 210/321.61, 321.74, 210/321.83, 321.78, 321.79, 321.8, 321.87, 321.88, 321.89; 55/158

[56] References Cited

U.S. PATENT DOCUMENTS

| | | | |
|---|---|---|---|
| 4,299,702 | 11/1981 | Bairinji et al. | 210/321.83 |
| 4,855,058 | 8/1989 | Holland et al. | 210/321.74 |
| 4,872,990 | 10/1989 | Van Wijk | 210/321.74 |
| 5,059,374 | 10/1991 | Krueger et al. | 210/321.8 |

Primary Examiner—Robert A. Dawson
Assistant Examiner—W. L. Millard
Attorney, Agent, or Firm—Shook, Hardy & Bacon

[57] ABSTRACT

A cleanable ultrafiltration device and method of making same is the subject of the present invention. The device comprises a housing for receiving a feed stream of a liquid to be filtered and a membrane cartridge disposed in the housing for separating the feed stream into concentrate and permeate. The cartridge is disposed within that housing in spaced relationship to accommodate the flow of the feed stream around the periphery of the cartridge along its length. A plastic netting is typically used for the cartridge/housing spacer. A potted end seal blocks the flow of the by-pass feed stream at the outlet end of the cartridge/housing assembly and forces all of the feed stream through the cartridge. This approach improves operating efficiency by elimination of the wasted by-pass flow associated with the prior art design, while maintaining module cleanability.

4 Claims, 1 Drawing Sheet

SPIRAL FILTRATION MODULE WITH IMPROVED CLEANABILITY AND OPERATING EFFICIENCY

This invention relates generally to the field of ultrafiltration and, more particularly, to an improved ultrafiltration module for use in various food and pharmaceutical applications and a method of constructing same.

Semipermeable membranes are utilized in both high pressure reverse osmosis and low pressure ultrafiltration and microfiltration processes. They are particularly useful in processing liquid foods (such as fruit juices) and pharmaceutical products (such as enzymes) where a product is to be refined but it is preferred not to alter the product through chemical additives or unnatural temperatures. A typical filtration process for such products would include membranes which are spirally wound around permeate tubes to form a module that is normally combined with a number of like modules inside of a cylindrical housing. A number of modules are normally employed in series or parallel combinations for filtration of a wide variety of food and pharmaceutical products.

It is, of course, essential that filtration systems be thoroughly cleaned after processing food or pharmaceutical materials. There is presently just one generally accepted spiral design approach to achieve this cleanability. This approach has been to apply an overwrap of plastic netting to the outer diameter of the spiral membrane cartridge to keep the filtering membrane spaced away from its associated housing. This approach is sometimes referred to as the "controlled by-pass" design since it is intended to accommodate continual by-pass of a small amount of feed stream along the inside wall of the housing. This assures that clean conditions will be maintained by precluding buildup of material between the cartridge and the housing. The disadvantage of the controlled by-pass design is that in most cases a substantial proportion of the feed flow will by-pass the filtration membrane, resulting in wasted pump energy and reduced operating efficiency. This occurs because there is a practical difficulty in controlling the cartridge outer diameter and housing internal diameter to the extent required to prevent a loose cartridge fit and preferential feed flow through the resultant gap.

There are two other spiral design approaches that prevent the feed by-pass problem but do not provide the ability to completely and readily clean the cartridge/-housing assembly after processing. One approach is to wrap a spiral membrane cartridge with an inert sealing material such as epoxy impregnated fiberglass and then utilize an elastomeric seal (called a "brine seal" in the art) to seal the small space between the cartridge and the housing. The primary disadvantage of this construction for food and pharmaceutical applications is that it is essentially impossible to clean the "dead" (no-flow) annular space between the cartridge and housing without first physically removing the cartridge and brine seal from the housing.

The other approach to eliminate by-pass has been to wrap the filtration cartridge in tape after which it is potted inside of a housing utilizing an epoxy potting material which fills the entire annulus between the cartridge and the housing. This design ensures that there is no buildup of food or other process material in the annulus but it is flawed by a tendency for process material to become lodged and build up between the tape layers over an extended period of time.

It is therefore a primary object of the present invention to provide an ultrafiltration module and method of constructing same which maintains cleanable conditions at a level comparable to that o the controlled by-pass design of the prior art but which actually precludes feed stream by-pass of the spiral membrane cartridge.

Other objects of the invention will be made clear by the following description in claims when read in light of the accompanying drawings wherein:

Figure 1:
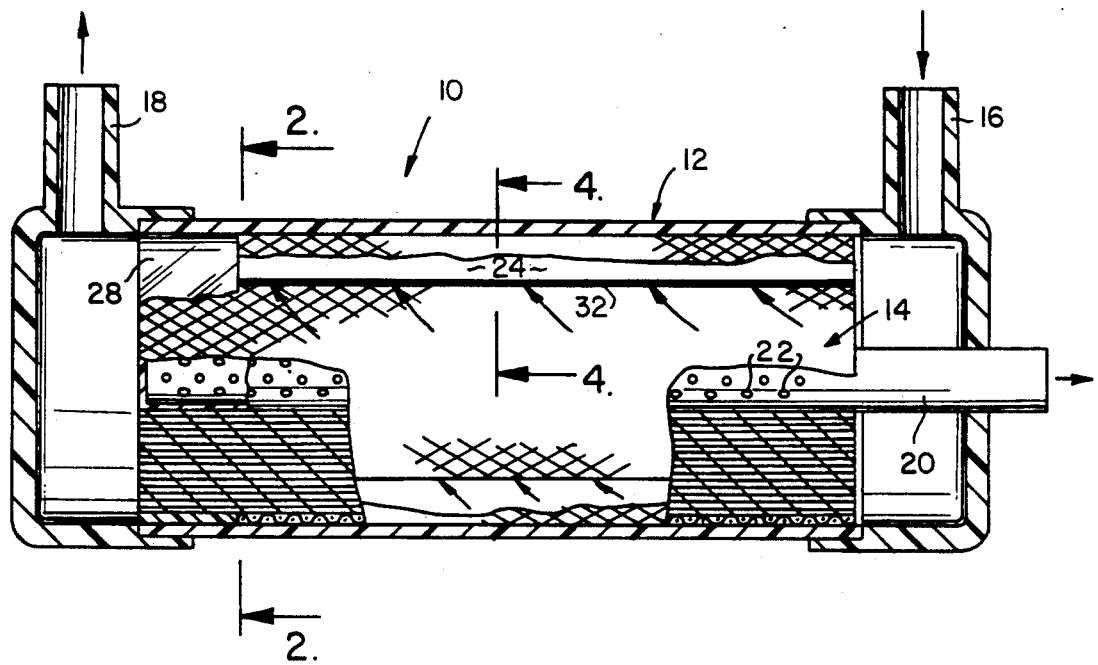
FIG. 1 is a vertical cross-sectional view through an ultrafiltration membrane housing with portions of the filtration cartridge being broken away for purposes of illustration.
Figure 4:
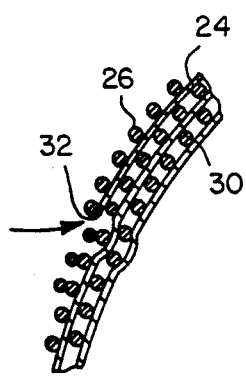
FIG. 4 is an enlarged cross-sectional view showing a leaf end of the filtration cartridge.
Figure 2:
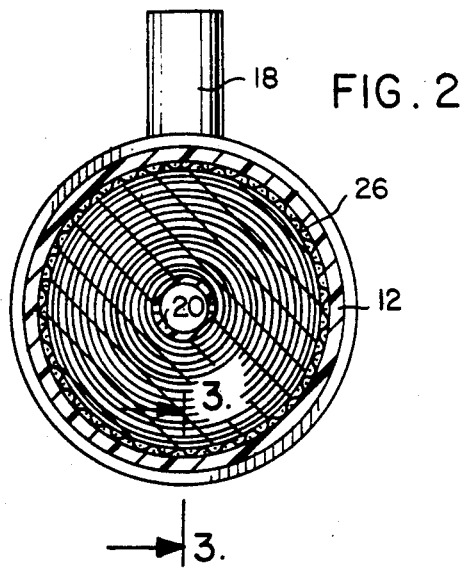
FIG. 2 is a vertical cross-sectional view taken along line 2—2 of FIG. 1.
Figure 3:
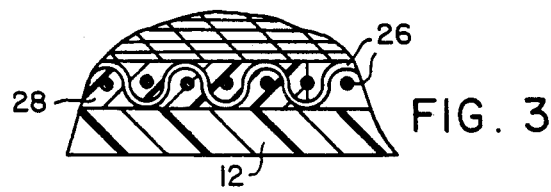
FIG. 3 is an enlarged vertical cross-sectional view taken along line 3—3 of FIG. 2.

Referring initially to FIG. 1, a cleanable ultrafiltration device is designated generally by the numeral 10 and comprises a housing 12 and a filtration cartridge 14. It is to be understood while device 10 has been shown and will be described as containing only a single cartridge, in some applications of the device multiple cartridges would be present in series within a single housing. Housing 12 includes a tubular inlet 16 through which a feed stream passes and a tubular outlet 18 through which concentrate passes.

Cartridge 14 is constructed according to techniques well-known to those skilled in the art and includes a permeate tube 20 with a plurality of openings 22 through which permeate may enter the tube. A leaf 24 comprising two membrane layers and a permeate carrier layer sandwiched between the membranes is spirally wound around tube 20 with a feed channel spacer 25 separating the layers of the wound leaf. The permeate carrier sheet (not shown) directs permeate from each layer in a spiral path to tube 20. Each leaf 24 is sealed with an epoxy or other sealant to prevent feed from contaminating the permeate Each leaf terminates at a "leaf" end 32 and the spacer 25 protrudes from the end 32. The filtration cartridge is provided with an outerwrap 26 which typically consists of plastic netting that functions as a spacer between the housing wall and the cartridge. It is to be noted that the individual filaments of the outerwrap 26 may be disposed at an angle of between 0 and 90 degrees, preferably between 30 and 60 degrees relative to the central axis of cartridge 14 as represented by tube 20. An angle of about 45 degrees is employed in the preferred embodiment illustrated in the drawings.

The plastic netting is typically an open mesh type material composed of a synthetic or polymeric material and well-known to those skilled in the art. It may be woven or nonwoven and of varying thickness and patterns. The material for constructing the netting should, of course, be nonreactive with the product being filtered. It will be readily appreciated by those skilled in the art that other types of spacers could be substituted for outerwrap 26 without departing from the scope of the present invention.

It is to be noted that by virtue of having spacer 25 project beyond leaf end 32 outerwrap 26 completely encases the outer leaf assuring no direct contact between the filtration membrane and the housing 12. This, is turn, assures that there will be fluid flow over the entire membrane surface and that there will be no "dead spots" where material can accumulate and bacteria can grow.

The end of cartridge 14 that is opposite the feed stream inlet is sealed by a potting compound preferably a thermoset material such as an epoxy which forms an end seal 28 and pots the outermost membrane layer of the module to housing 12. Other flowable, hardenable materials may be used for the potting compound.

Thus the method of constructing a cleanable filtration module according to the present invention includes providing a housing having a feed stream inlet and a concentrate outlet and placing an ultrafiltration cartridge within the housing. An outerwrap of plastic netting material of the type previously described is utilized to hold the membrane cartridge in spaced relationship to the housing wall. The end of the cartridge opposite the inlet end of the housing is the potted to the housing utilizing an epoxy or other inert adhesive type of material.

In use, a material to be filtered is introduced as feed stock into inlet 16 where it passes in an axial direction through cartridge 14. That portion of the feed stream which reaches permeate tube 20 will pass into the tube through openings 22 and be discharged at one end of the tube as indicated by the arrow at the right side of FIG. 1. Because of outerwrap 26, there will be a continual "by-pass flow" of feed stock between the module and the wall of housing 12. However, as a result of the presence of the potted end seal 28, this so called "by-pass flow" will actually be precluded from by-passing the cartridge because it will instead be continually forced radially back into the cartridge, via flow under the leaf end 32, and across the surface of the membrane 24 before finally exiting the cartridge. The general pattern of the "by-pass flow" is indicated by the arrows in FIG. 1. This approach essentially eliminates the wasted feed flow which exists for the prior art "controlled by-pass" design, but at the same time prevents buildup of process material and allows thorough scouring and cleaning in the cartridge/housing annulus as well as around the epoxy seal itself.

Accordingly, utilizing the method and device of the present invention, a cleanable condition comparable to that obtained by the prior art controlled by-pass design (and not achievable by the prior art hard overwrap/brine seal or taped/potted approaches) is achieved without the feed stock actually by-passing the filtration cartridge, thus substantially avoiding the energy losses and filtration efficiency losses associated with the "controlled-by-pass" design.

What is claimed is:

1. A device for use in ultrafiltration of a liquid feed stream, said device comprising:
   a housing including means for receiving said feed stream at one end thereof;
   a filtration cartridge for separating said feed stream into concentrate and permeate,
   said cartridge being disposed within said housing in spaced relationship to the latter to accommodate the flow of said feed stream around the periphery of and radially inward through at least a portion of the cartridge along its length;
   means for maintaining said cartridge in spaced relationship to said housing without blocking liquid flow through said housing;
   means coupled with said housing for accommodating withdrawal of permeate; and
   potting means for sealing said cartridge to said housing at the end of the latter opposite said one end only, the other end of said housing being open to accommodate liquid flow into said housing in the direction of said one end, whereby when said feed stream enters said housing at said other end it flows between said cartridge and said housing and then enters said cartridge but is precluded from by-passing said cartridge by said potting means.

2. A device as set forth in claim 1 wherein said means for maintaining said cartridge in spaced relationship comprises a netting formed of inert material.

3. A device as set forth in claim 2, wherein said netting is formed from filaments which extend at an angle of 9°–90° relative to the longitudinal axis of said module.

4. A device for use in ultrafiltration of a liquid feed stream, said device comprising:
   a housing including means for receiving said feed stream;
   a filtration cartridge for separating said feed stream into concentrate and permeate, said cartridge being disposed within said housing and in spaced relationship to the latter to accommodate the flow of said feed stream around the periphery of and radially inward through at least a portion of the cartridge along its length;
   a liquid permeable outerwrap surrounding said cartridge, said outerwrap comprising a netting formed of inert material having filaments which extend at an angle of 0°–90° relative to the longitudinal axis of said module;
   means coupled with said housing for accommodating withdrawal of permeate; and
   flow blocking means sealed to said cartridge and to said housing at one end of the latter whereby when said feed stream flows between said cartridge and said housing, it is precluded from by-passing said cartridge.

* * * * *

UNITED STATES PATENT AND TRADEMARK OFFICE
CERTIFICATE OF CORRECTION

PATENT NO. : 5,192,437

DATED : March 9, 1993

INVENTOR(S) : Jikuo Chang and Robert G. Blanck

It is certified that error appears in the above-identified patent and that said Letters Patent is hereby corrected as shown below:

Column 2, line 6 of the printed patent, "o" should be --of--.

Column 2, line 43 of the printed patent, a period should be inserted after the word "permeate".

Signed and Sealed this

Eighteenth Day of January, 1994

Attest:

BRUCE LEHMAN

Attesting Officer　　　Commissioner of Patents and Trademarks